US011053427B2

(12) United States Patent
Lv et al.

(10) Patent No.: US 11,053,427 B2
(45) Date of Patent: Jul. 6, 2021

(54) LOW-DENSITY, HIGH-STRENGTH DEGRADABLE TEMPORARY PUGGING AGENT AND THE PREPARATION METHOD AND USE THEREOF

(71) Applicant: PetroChina Company Limited, Beijing (CN)

(72) Inventors: Baoqiang Lv, Beijing (CN); Lijun Mu, Beijing (CN); Zhenfeng Zhao, Beijing (CN); Hongjun Lu, Beijing (CN); Xiangqian Bu, Beijing (CN); Yin Qi, Beijing (CN); Jianshan Li, Beijing (CN); Boping Zhao, Beijing (CN); Xiangping Li, Beijing (CN); Jianhui Li, Beijing (CN); Li'an Yang, Beijing (CN); Jun Bu, Beijing (CN)

(73) Assignee: PetroChina Company Limited, Beijing (CN)

( * ) Notice: Subject to any disclaimer, the term of this patent is extended or adjusted under 35 U.S.C. 154(b) by 238 days.

(21) Appl. No.: 16/235,700

(22) Filed: Dec. 28, 2018

(65) Prior Publication Data

US 2019/0136116 A1 May 9, 2019

Related U.S. Application Data

(63) Continuation of application No. PCT/CN2017/108470, filed on Oct. 31, 2017.

(30) Foreign Application Priority Data

Mar. 1, 2017 (CN) .......................... 201710118249.6

(51) Int. Cl.
C09K 8/508 (2006.01)
C09K 8/514 (2006.01)

(52) U.S. Cl.
CPC ............ C09K 8/5086 (2013.01); C09K 8/508 (2013.01); C09K 8/5083 (2013.01); C09K 8/514 (2013.01)

(58) Field of Classification Search
CPC ........ C09K 8/50; C09K 8/508; C09K 8/5083; C09K 8/514
See application file for complete search history.

(56) References Cited

U.S. PATENT DOCUMENTS

2004/0030043 A1* 2/2004 Aranishi .............. C08K 5/0016
525/54.3
2013/0133887 A1 5/2013 Todd
(Continued)

FOREIGN PATENT DOCUMENTS

CN 102653673 A 9/2012
CN 103409121 A 11/2013
(Continued)

OTHER PUBLICATIONS

International Search Report, PCT/CN2017/108470 (dated Feb. 5, 2018).
(Continued)

Primary Examiner — Aiqun Li
(74) Attorney, Agent, or Firm — Foley & Lardner LLP

(57) ABSTRACT

A low density, high-strength, degradable temporary plugging agent which includes 60% by weight to 85% by weight of polylactic acid, 5% by weight to 20% by weight of a starch, 5% by weight to 10% by weight of polycaprolactone, 2% by weight to 5% by weight of a solubilizing agent, and 2% by weight to 5% by weight of a toughening agent, based on 100% by weight of the total weight of the agent. The rigid agent can result in bridge plugging in existing cracks, with a significant increase in pressure. The preparation method is simple, the process requirements are low, and industrial production can be realized. When applied to temporary plugging fracturing, under formation conditions, it can be completely degraded within a certain period of time and will not cause secondary damage to the reservoir, while preventing the agent from polluting the formation and the occurrence of pump accidents.

14 Claims, 2 Drawing Sheets

(56) References Cited

U.S. PATENT DOCUMENTS

2015/0159465 A1    6/2015  Lecerf et al.
2016/0060506 A1*  3/2016  Takahashi ............... C08L 67/04
                                                              507/212

FOREIGN PATENT DOCUMENTS

| CN | 103930515 A | 7/2014 |
|---|---|---|
| CN | 104712303 A | 6/2015 |
| CN | 104962052 A | 10/2015 |
| CN | 104987682 A | 10/2015 |
| CN | 105086973 A | 11/2015 |
| CN | 105694404 A | 6/2016 |
| CN | 105907059 A | 8/2016 |
| CN | 107288574 A | 10/2017 |

OTHER PUBLICATIONS

Wei, W., "Preaparation and Properties of Starch/Poly (lactic acid) Composites," Dissertation for the Master Degree in Engineering, Harbin Univ. of Science and Technology (China), 62 pages (Mar. 15, 2010).

Chinese Office Action and Search Report, App. No. 201710118249.6 (dated Jul. 3, 2019).

* cited by examiner

LOW-DENSITY, HIGH-STRENGTH DEGRADABLE TEMPORARY PUGGING AGENT AND THE PREPARATION METHOD AND USE THEREOF

CROSS-REFERENCE TO RELATED APPLICATIONS

This application is a continuation of International Application No. PCT/CN2017/108470, filed on Oct. 31, 2017, which claims priority to Chinese Patent Application No. 201710118249.6, filed on Mar. 1, 2017, both of which are incorporated herein by reference in their entireties.

TECHNICAL FIELD

The invention relates to a low density, high-strength, degradable temporary plugging agent and the preparation method and use thereof, which belongs to the technical field of oil field chemical engineering.

BACKGROUND

In temporary fracturing technology, a temporary plugging agent is added in real time during fracturing to temporarily plug old cracks or sanded cracks, which allows steering of fluid by changing cracking pressure and crack extension pressure, thereby forming new cracks. The mechanism of temporary plugging agents and the action thereof in cracks lies in that: for internal steering materials developed based on the principle of bridge plugging with granular materials, after a temporary plugging agent is added during repeated fracturing operations, because a hydraulic fracturing crack has the largest dynamic crack width near the wellbore, the crack becomes smaller in width as it advances further away from the well; after the temporary plugging agent and the proppant both enter the fracturing crack in a certain ratio, under the combined action of the proppant and the temporary plugging agent, the temporary plugging agent solid particles will form a bridge plugging at sites where the solid particle size of the temporary plugging agent is larger than ⅓-⅔ of the dynamic width of the crack, and blocks the path of the upcoming temporary plugging agent particles which results in accumulation; as the addition of upcoming temporary plugging agent continues, more and more temporary plugging agent particles contribute to the bridge plugging and accumulation, forming a blockade band with a certain thickness and length within the main channel of the crack; this hinders and limits the continued extending and advancing of the crack; as subsequent addition of sand-carrying fluid is continued, the volume of the crack between the wellbore and the blockade band keeps decreasing, and the net pressure in the crack keeps increasing; when the net pressure in the crack reaches the micro-crack opening pressure or the new crack breaking pressure, micro-cracks or new cracks will be opened; with the subsequent addition of the sand-carrying fluid continued, the micro-cracks or new cracks will extend and advance into new branch cracks.

Some researches have been carried out domestically and abroad on the investigation of temporary plugging agents during fracturing.

Chinese Patent Application No. 201610227808.2 discloses a temporary plugging agent and its preparation method. The temporary plugging agent forms a filter cake when brought into contact with water and prevent the processed liquid from flowing into the oil layer. After the procedure is completed, the plugging agent in the form of a filter cake will be dissolved in crude oil to restore the permeability of the oil layer. The plugging agent is used in sandblasting operations in oil wells. The components of the plugging agent are mainly composed of a modified oil-soluble resin, a crosslinking agent and a temperature-resistant salt ultra-high molecular weight polymer.

Chinese Patent CN103409121A discloses a water-soluble fracturing steering temporary plugging agent, which is composed of a plant starch, a high polymer, a swelling agent, and a curing agent. Here, the mass ratio among the plant starch, the high polymer, the swelling agent, and the curing agent is 4.5:3.5:0.5:1.5. The temporary plugging is in such a manner where the breakthrough pressure is assessed by forming a filter cake in water with the plugging agent.

Chinese patent CN102653673A discloses a biodegradable temporary plugging agent, which is composed of a biodegradation agent, an organic swelling material, and a thickening agent, wherein the biodegradation agent is a particulate mixture of soybean and corn used in an amount of 60-85% by weight percentage. In the particulate mixture, the weight ratio between soybean and corn is 1:2 to 2:1, with a particle size of 2 to 3 times of the outlet sand particle size.

As such, traditional temporary plugging fracturing in the related field is mainly based on a filter cake plugging mode in which the plugging agent forms a filter cake in cracks. In order to expand the temporary plugging modes of temporary plugging fracturing, there grows an urgent need in solving the technical problem of providing a low-density, high-strength, degradable temporary plugging agent as well as the preparation method and use thereof in the related field.

SUMMARY

In order to solve the above technical problems, it is the object of the present disclosure to provide a low density, high-strength, degradable temporary plugging agent and the preparation method and use thereof.

In order to achieve the above object, the present disclosure provides a low-density, high-strength, degradable temporary plugging agent which includes 60% by weight to 85% by weight of polylactic acid, 5% by weight to 20% by weight of a starch, 5% by weight to 10% by weight of polycaprolactone, 2% by weight to 5% by weight of a solubilizing agent, 2% by weight to 5% by weight of a toughening agent, based on 100% by weight of the total weight of the temporary plugging agent.

According to a specific embodiment, in the temporary plugging agent, preferably, the weight ratio of the starch to the polycaprolactone is from 1:1 to 2:1.

According to a specific embodiment, in the temporary plugging agent, preferably, the polylactic acid has a molecular weight of 9,000,000 to 11,000,000, a melting point of 175° C., and a tensile strength of more than 70 MPa.

According to a specific embodiment, in the temporary plugging agent, preferably, the starch is a soluble starch.

According to a specific embodiment, in the temporary plugging agent, preferably, the soluble starch includes a combination of one or more of corn starch, rice starch, millet starch, tapioca starch, and potato starch.

According to a specific embodiment, in the temporary plugging agent, preferably, the toughening agent includes one of styrene-butadiene rubber, polybutylene succinate, polybutylene adipate, chitin, and chitosan. Among them, the styrene-butadiene rubber used is an industrial grade product, which can increase the toughness of the temporary plugging agent product under pressure.

According to a specific embodiment, in the temporary plugging agent, preferably, the solubilizing agent includes one of glycerin, water, polyvinyl alcohol, polyethylene glycol, and tetrabutyl titanate. Among them, glycerin is an industrial grade product, which is a solubilizing agent when the polylactic acid, starch, polycaprolactone, and styrene-butadiene rubber are blended.

According to a specific embodiment, preferably, the temporary plugging agent particles have a particle size of 1 to 4 mm. Wherein, in the specific embodiment of the present application, the particle size of the temporary plugging agent particles can be selected according to different dynamic crack widths of the target well.

According to a specific embodiment, preferably, the temporary plugging agent particles have a density of 1.1 to 1.3 g/cm$^3$ and a bearing strength of greater than 52 MPa.

The present disclosure also provides a preparation method for the temporary plugging agent, which includes the steps of: blending the polylactic acid, the solubilizing agent, the toughening agent, the starch, and the polycaprolactone before they are further extrusion molded to obtain the temporary plugging agent.

According to a specific embodiment, preferably, the preparation method specifically includes the steps of: blending the polylactic acid, the solubilizing agent, the toughening agent, the starch and the polycaprolactone to obtain a mixture; and then injecting the mixture into a twin-screw extruder for extrusion molding to obtain the temporary plugging agent. The twin-screw extruder has an extrusion temperature of 140-160° C. and a screw rotation speed of 100-300 r/min.

In the preparation process of the temporary plugging agent in the application, the order of adding the raw materials of the polylactic acid, solubilizing agent, toughening agent, starch and polycaprolactone is not specifically required.

The present disclosure also provides the use of the temporary plugging agent in the temporary plugging fracturing of oil wells or gas wells in an oil field.

The specific preparation process of the temporary plugging agent is as follows: in the blend of the polylactic acid, starch, solubilizing agent, polycaprolactone and toughening agent, the polylactic acid is a continuous parent phase, while the starch often serves as a filler in the blended system due to the smaller particle size and lower cost thereof and may rapidly absorb water and swell at a certain temperature because the constituent molecules of starch are polyhydroxy compounds with extremely strong water-absorbing properties. However, the most critical problem in the blended system of polylactic acids and starch lies in that the bonding force at the interface between the hydrophobic polylactic acid and the hydrophilic starch is too weak, that is, the compatibility therebetween is poor. Therefore, an approach to improve the compatibility among the blended composite materials is to introduce a third phase of a solubilizing agent to reduce the interfacial energy, promote the diffusion, and improve the adhesion between the polylactic acid and the starch; and the polycaprolactone used is a biodegradable polymer with a relatively slow degradation rate, while the use of polycaprolactone and starch in combination can regulate the degradation rate of the temporary plugging agent system.

According to a specific embodiment, for the use as described, the temperature of the reservoir of the oil field is preferably between 30 and 90° C.

According to a specific embodiment, for the use as described, the injection conditions for the temporary plugging agent include an operation discharge of 2-4 m$^3$/min, a sand ratio of 180-327 kg/m$^3$, a single-stage injection amount of the temporary plugging agent of 100-200 kg, and an injection speed of the temporary plugging agent of 20-50 kg/min.

In application, the degradation process of the temporary plugging agent is as follows: the temporary plugging agent absorbs and swells to fracture under the formation temperature, loses the mechanical strength, and finally degrades into water and carbon dioxide over time.

Compared with the prior art, the temporary plugging agent provided by the present disclosure has the following technical effects:

The low-density, high-strength, degradable temporary plugging agent is a rigid temporary plugging agent which can lead to bridge plugging in existing cracks, with significant increase in pressure by temporary plugging; in a test conducted on the temporary plugging agent provided by the present disclosure according to SY/T5108-2006 "Fracturing Proppant Performance Indices and Recommended Method of Testing", the test results demonstrate:

The temporary plugging agent has a density (30° C.) of 1.1-1.3 g/cm$^3$ and a bearing strength of more than 52 MPa. The mechanical strength thereof is lost within 48 hours under the condition of the reservoir temperature, and the duration of ultimate degradation is 168 hours (anaerobic natural degradation at 60° C.); this is suitable for reservoirs with a temperature of 30° C. to 90° C.

The preparation method for the temporary plugging agent is simple, the process requirement is low, and industrialized production can thus be realized.

When the temporary plugging agent provided by the present disclosure is applied for temporary plugging fracturing, under formation conditions, it can be completely degraded within a certain period of time and will not cause secondary damage to the reservoir, while preventing the temporary plugging agent from polluting the formation and the occurrence of pump accidents.

DETAILED DESCRIPTION

Figure 1:
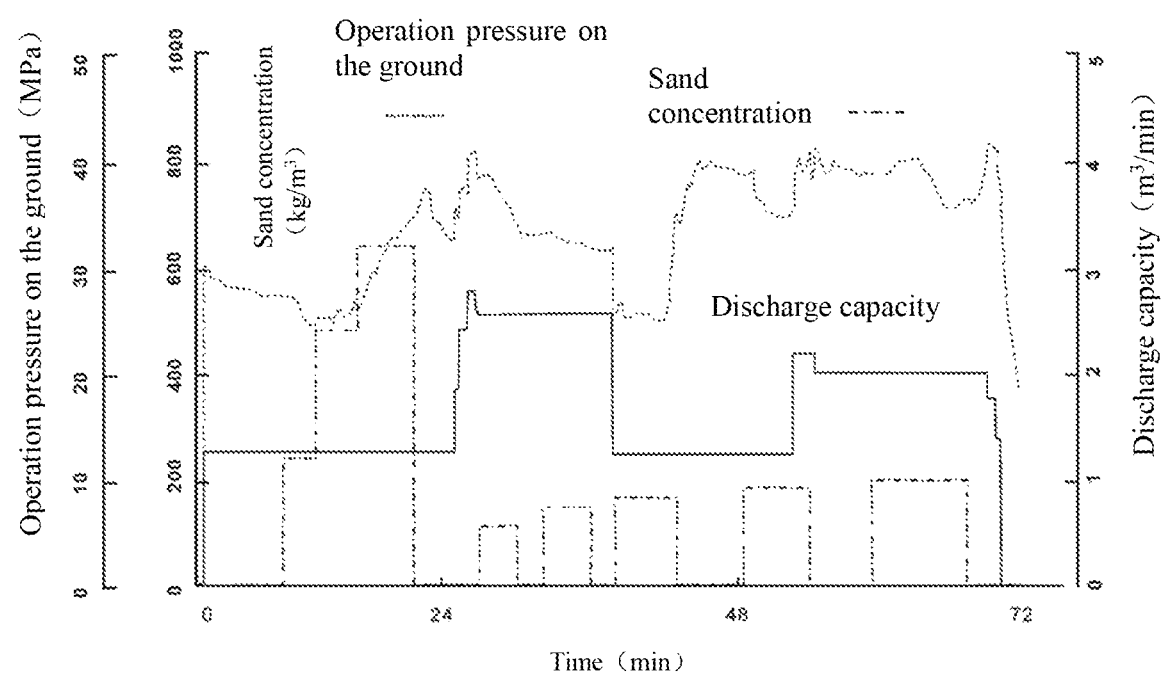
FIG. 1 is an operation diagram of a G125-164 oil well in an application example.

For better understanding of the technical features, objects, and advantages of the present disclosure, the embodiments described herein and the beneficial effects resulted therefrom will be described in details below by way of the specific Examples, which is intended for the reader to better understand the spirit and characteristics of the invention, but not to limit the scope of the invention.

Example 1

This Example provides a low-density, high-strength, degradable temporary plugging agent, wherein the temporary plugging agent comprises 60% by weight of polylactic acid, 20% by weight of corn starch, 10% by weight of polycaprolactone, 5% by weight of glycerin, and 5% by weight of styrene-butadiene rubber, based on 100% by weight of the total weight of the temporary plugging agent.

The above temporary plugging agent was prepared by the following steps: the polylactic acid, glycerin, styrene-butadiene rubber, corn starch, and polycaprolactone were added to a high-speed mixer in the above-mentioned weight percentage, and uniformly stirred to obtain a mixture; the mixture was then injected into a twin-screw extruder, with the temperature set at 140° C. in Area 1, 155° C. in Area 2, 160° C. in Area 3, 160° C. in Area 4, and 155° C. in Area 5, and a screw rotation speed of 100 r/min; and the temporary plugging agent was obtained after extrusion molding.

Example 2

This Example provides a low-density, high-strength, degradable temporary plugging agent, wherein the temporary plugging agent comprises 75% by weight of polylactic acid, 11% by weight of rice starch, 8% by weight of polycaprolactone, 4% by weight of water, and 2% by weight of polybutylene succinate, based on 100% by weight of the total weight of the temporary plugging agent.

The above temporary plugging agent was prepared by the following steps:

the polylactic acid, water, polybutylene succinate, rice starch, and polycaprolactone were added to a high-speed mixer in the above-mentioned weight percentage, and uniformly stirred to obtain a mixture; the mixture was then injected into a twin-screw extruder, with the temperature set at 140° C. in Area 1, 155° C. in Area 2, 160° C. in Area 3, 160° C. in Area 4, and 155° C. in Area 5, and a screw rotation speed of 150 r/min; and the temporary plugging agent was obtained after extrusion molding.

Example 3

This Example provides a low-density, high-strength, degradable temporary plugging agent, wherein the temporary plugging agent comprises 85% by weight of polylactic acid, 5% by weight of millet starch, 5% by weight of polycaprolactone, 2.5% by weight of polyvinyl alcohol, and 2.5% by weight of polybutylene adipate, based on 100% by weight of the total weight of the temporary plugging agent;

The above temporary plugging agent was prepared by the following steps:

the polylactic acid, polyvinyl alcohol, polybutylene adipate, millet starch, and polycaprolactone were added to a high-speed mixer in the above-mentioned weight percentage, and uniformly stirred to obtain a mixture; the mixture was then injected into a twin-screw extruder, with the temperature set at 140° C. in Area 1, 155° C. in Area 2, 160° C. in Area 3, 160° C. in Area 4, and 155° C. in Area 5, and a screw rotation speed of 200 r/min; and the temporary plugging agent was obtained after extrusion molding.

Example 4

This Example provides a low-density, high-strength, degradable temporary plugging agent, wherein the temporary plugging agent comprises 81% by weight of polylactic acid, 10% by weight of tapioca starch, 5% by weight of polycaprolactone, 2% by weight of polyethylene glycol, and 2% by weight of chitin, based on 100% by weight of the total weight of the temporary plugging agent.

The above temporary plugging agent was prepared by the following steps:

the polylactic acid, polyethylene glycol, chitin, tapioca starch, and polycaprolactone were added to a high-speed mixer in the above-mentioned weight percentage, and uniformly stirred to obtain a mixture; the mixture was then injected into a twin-screw extruder, with the temperature set at 140° C. in Area 1, 155° C. in Area 2, 160° C. in Area 3, 160° C. in Area 4, and 155° C. in Area 5, and a screw rotation speed of 250 r/min; and the temporary plugging agent was obtained after extrusion molding.

Example 5

This Example provides a low-density, high-strength, degradable temporary plugging agent, wherein the temporary plugging agent comprises 65% by weight of polylactic acid, 15% by weight of potato starch, 10% by weight of polycaprolactone, 5% by weight of tetrabutyl titanate, and 5% by weight of chitosan, based on 100% by weight of the total weight of the temporary plugging agent.

The above temporary plugging agent was prepared by the following steps:

the polylactic acid, tetrabutyl titanate, chitosan, potato starch, and polycaprolactone were added to a high-speed mixer in the above-mentioned weight percentage, and uniformly stirred to obtain a mixture; the mixture was then injected into a twin-screw extruder, with the temperature set at 140° C. in Area 1, 155° C. in Area 2, 160° C. in Area 3, 160° C. in Area 4, and 155° C. in Area 5, and a screw rotation speed of 300 r/min; and the temporary plugging agent was obtained after extrusion molding.

Test Example

The low-density, high-strength, degradable temporary plugging agent obtained in Example 1-5 was tested by SY/T5108-2006 "Fracturing Proppant Performance Indices and Recommended Method of Testing". The test results show that the temporary plugging agent provided by the disclosure has the following characteristics:

(1) density (30° C.): 1.1-1.3 $g/cm^3$;

(2) the bearing strength is greater than 52 MPa;

(3) the plugging agent loses mechanical strength within 48 hours under the condition of the reservoir temperature, and the duration of ultimate degradation is 168 hours (anaerobic natural degradation at 60° C.);

(4) suitable for reservoirs with a temperature of 30° C. to 90° C.

Application Example

This Application Example provides the application of the temporary plugging agent in the temporary plugging fracturing of oil wells in Changqing oil field, which includes the following steps:

1. For test well 1, G125-164, the injection conditions for the temporary plugging agent were: an operation discharge of 2.0 $m^3$/min, a sand concentration of 180 $kg/m^3$, an injection amount of the temporary plugging agent (Example 1) of 150 kg, and an injection speed of the temporary plugging agent of 20-50 kg/min. The operation diagram of the G125-164 oil well is shown in FIG. 1. It can be seen from FIG. 1 that after the temporary plugging agent passes through the perforation holes, the operation pressure at the wellhead rises from 28 MPa to 40 MPa, with an increase of 12 MPa (after the temporary plugging agent used passes through the perforation holes, it accumulates in the cracks in the formation, while the constriction causes an increase in static pressure). In view of the increase in pressure, it can be concluded that there is crack steering during the procedure.

Figure 2:
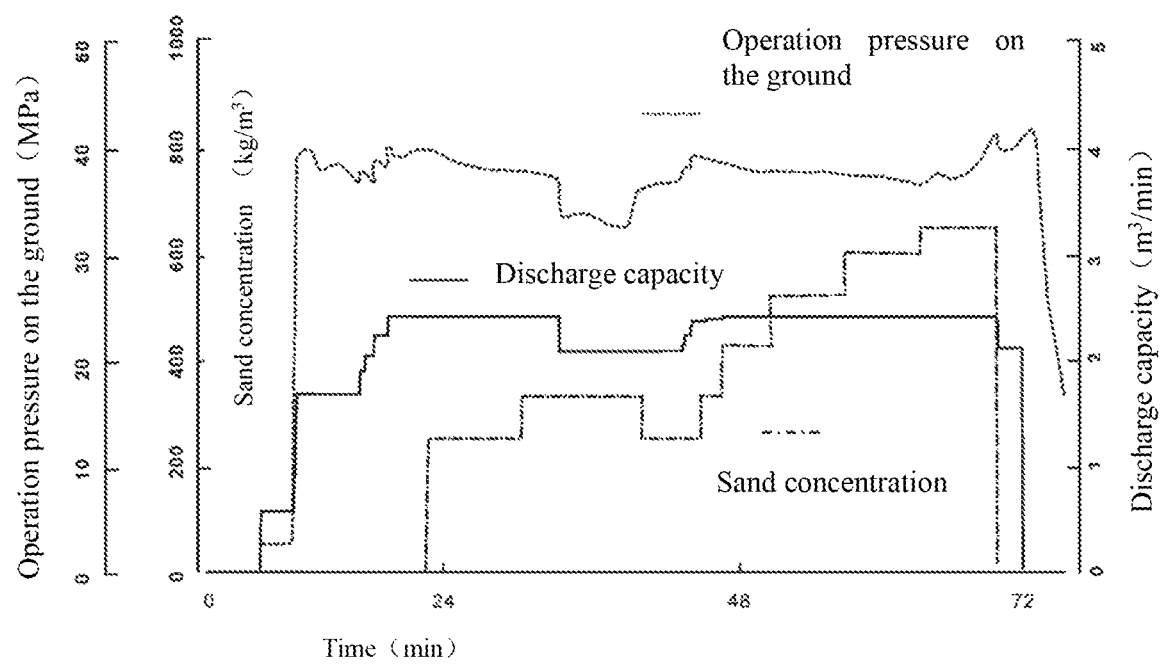
FIG. 2 is an operation diagram of a G123-162 oil well in an application example.

2. For test well 2, G123-162, the injection conditions for the temporary plugging agent were: an operation discharge of 2.0 $m^3$/min, a sand concentration of 227 $kg/m^3$, an injection amount of the temporary plugging agent (Example 1) of 200 kg, and an injection speed of the temporary plugging agent of 20-50 kg/min. The operation diagram of the G125-162 oil well is shown in FIG. 2. It can be seen from FIG. 2 that after the temporary plugging agent passes through the perforation holes, the operation pressure of the wellhead rises from 34.5 MPa to 37.5 MPa, with an increase of 3 MPa.

The temporary plugging agent was used to complete the field tests of 13 wells in the Changqing oil field. The test results show that the single well production increases from 0.97 t to 2.62 t at an early stage of the procedure, with an average daily oil increase from a single well of 1.65 t. At present, the wells subjected to the procedure have an average single well production of 2.02 t, an effectiveness of the procedure of 92.3%, and an accumulated oil increase of 2331.11 tons.

Illustrated above are only the preferred Examples of the present invention, but they are not intended to limit the scope of the present invention. Any equivalent changes and modifications made on the basis of the disclosure in the scope of the invention should be construed as falling within the technical scope of the present invention.

What is claimed is:

1. A temporary plugging agent, wherein it comprises 60% by weight to 85% by weight of polylactic acid, 5% by weight to 20% by weight of a starch, 5% by weight to 10% by weight of polycaprolactone, 2% by weight to 5% by weight of a solubilizing agent, 2% by weight to 5% by weight of a toughening agent, based on 100% by weight of the total weight of the temporary plugging agent;
    wherein the polylactic acid has a molecular weight of 9,000,000 to 11,000,000, a melting point of 175° C., and a tensile strength of more than 70 MPa.

2. The temporary plugging agent according to claim 1, wherein the weight ratio of the starch to the polycaprolactone is 1:1 to 2:1.

3. The temporary plugging agent according to claim 1, wherein the starch is a soluble starch.

4. The temporary plugging agent according to claim 3, wherein the soluble starch comprises a combination of one or more of corn starch, rice starch, millet starch, tapioca starch, and potato starch.

5. The temporary plugging agent according to claim 1, wherein the toughening agent comprises at least one of styrene-butadiene rubber, polybutylene succinate, polybutylene adipate, chitin, or chitosan.

6. The temporary plugging agent according to claim 1, wherein the solubilizing agent comprises at least one of glycerin, water, polyvinyl alcohol, polyethylene glycol, or tetrabutyl titanate.

7. The temporary plugging agent according to claim 1, wherein the temporary plugging agent particles have a particle size of 1-4 mm.

8. The temporary plugging agent according to claim 1, wherein the temporary plugging agent particles have a density of 1.1-1.3 g/cm$^3$ and a bearing strength of more than 52 MPa.

9. A method of preparing a temporary plugging agent comprising 60% by weight to 85% by weight of polylactic acid, 5% by weight to 20% by weight of a starch, 5% by weight to 10% by weight of polycaprolactone, 2% by weight to 5% by weight of a solubilizing agent, 2% by weight to 5% by weight of a toughening agent, based on 100% by weight of the total weight of the temporary plugging agent, wherein the polylactic acid has a molecular weight of 9,000,000 to 11,000,000, a melting point of 175° C., and a tensile strength of more than 70 MPa, the method comprising the steps of:
    blending the polylactic acid, the solubilizing agent, the toughening agent, the starch, and the polycaprolactone before they are further extrusion molded to obtain the temporary plugging agent.

10. The preparation method according to claim 9, wherein the preparation method specifically comprises the steps of: blending the polylactic acid, the solubilizing agent, the toughening agent, the starch, and the polycaprolactone to obtain a mixture; and then injecting the mixture into a twin-screw extruder for extrusion molding to obtain the temporary plugging agent;
    wherein the twin-screw extruder has an extrusion temperature of 140-160° C. and a screw rotation speed of 100-300 r/min.

11. A method of temporary plugging fracturing of oil wells or gas wells in an oil field, comprising:
    injecting a temporary plugging agent into an oil well or a gas well, the temporary plugging agent comprising 60% by weight to 85% by weight of polylactic acid, 5% by weight to 20% by weight of a starch, 5% by weight to 10% by weight of polycaprolactone, 2% by weight to 5% by weight of a solubilizing agent, 2% by weight to 5% by weight of a toughening agent, based on 100% by weight of the total weight of the temporary plugging agent in the temporary plugging fracturing of oil wells or gas wells in an oil field, wherein the polylactic acid has a molecular weight of 9,000,000 to 11,000,000, a melting point of 175° C., and a tensile strength of more than 70 MPa.

12. The method according to claim 11, wherein a temperature of reservoirs in the oil field is 30-90° C.

13. The method according to claim 11, wherein injection conditions for the temporary plugging agent include:
    an operation discharge of 2-4 m$^3$/min, a sand ratio of 180-327 kg/m$^3$, a single-stage injection amount of the temporary plugging agent of 100-200 kg, and an injection speed of the temporary plugging agent of 20-50 kg/min.

14. The method according to claim 12, wherein injection conditions for the temporary plugging agent include:
    an operation discharge of 2-4 m$^3$/min, a sand ratio of 180-327 kg/m$^3$, a single-stage injection amount of the temporary plugging agent of 100-200 kg, and an injection speed of the temporary plugging agent of 20-S0 kg/min.

* * * * *